(12) United States Patent
Takase (10) Patent No.: US 10,780,434 B2
(45) Date of Patent: Sep. 22, 2020

(54) HONEYCOMB STRUCTURE

(71) Applicant: NGK INSULATORS, LTD., Nagoya-Shi (JP)

(72) Inventor: Naoya Takase, Nagoya (JP)

(73) Assignee: NGK Insulators, Ltd., Nagoya-Shi (JP)

(*) Notice: Subject to any disclaimer, the term of this patent is extended or adjusted under 35 U.S.C. 154(b) by 291 days.

(21) Appl. No.: 15/915,593

(22) Filed: Mar. 8, 2018

(65) Prior Publication Data

US 2018/0264456 A1 Sep. 20, 2018

(30) Foreign Application Priority Data

Mar. 15, 2017 (JP) .................. 2017-050183

(51) Int. Cl.

| | | |
|---|---|---|
| *B01J 35/04* | (2006.01) | |
| *F01N 3/28* | (2006.01) | |
| *F01N 3/20* | (2006.01) | |
| *B01D 53/94* | (2006.01) | |

(52) U.S. Cl.
CPC ............ *B01J 35/04* (2013.01); *F01N 3/2026* (2013.01); *F01N 3/2803* (2013.01); *F01N 3/2828* (2013.01); *B01D 53/94* (2013.01); *F01N 2330/06* (2013.01); *F01N 2330/30* (2013.01); *F01N 2330/34* (2013.01); *F01N 2330/48* (2013.01); *Y02T 10/26* (2013.01)

(58) Field of Classification Search
None
See application file for complete search history.

(56) References Cited

U.S. PATENT DOCUMENTS

| | | |
|---|---|---|
| 5,399,841 A | 3/1995 | Abe et al. |
| 2002/0045541 A1 | 4/2002 | Koike et al. |
| 2002/0092298 A1 | 7/2002 | Bruck et al. |
| 2014/0010720 A1 | 1/2014 | Kasai et al. |

FOREIGN PATENT DOCUMENTS

| | | |
|---|---|---|
| EP | 1 212 521 B1 | 6/2002 |
| EP | 3 282 105 A1 | 2/2018 |
| JP | H06-066132 A | 3/1994 |
| JP | 2002-177793 A1 | 6/2002 |
| JP | 2006-224031 A1 | 8/2006 |
| JP | 2010-229976 A1 | 10/2010 |
| JP | 2012-188958 A1 | 10/2012 |
| JP | 2016-196868 A1 | 11/2016 |
| WO | 2012/133056 A1 | 10/2012 |

OTHER PUBLICATIONS

German Office Action, German Application No. 10 2018 203 905.4, dated May 12, 2020 (4 pages).
Japanese Office Action (with English translation), Japanese Application No. 2017-050183 dated Aug. 11, 2020 (9 pages).

*Primary Examiner* — David Sample
*Assistant Examiner* — Elizabeth Collister
(74) *Attorney, Agent, or Firm* — Burr & Brown, PLLC

(57) ABSTRACT

A columnar honeycomb structure includes an outer peripheral side wall having an outer peripheral side surface; a plurality of partition walls that partition and form a plurality of cells penetrating from one bottom surface to another bottom surface to form flow paths, the plurality of partition walls being disposed inside the outer peripheral side wall; and a pair of terminal connection portions arranged so as to be opposed to each other on the outer peripheral side surface of the outer peripheral side wall, wherein the honeycomb structure satisfies a relational expression of $1.3 \leq L_2/L_1$ in which: in a cross section perpendicular to a direction of the flow paths of the cells.

7 Claims, 9 Drawing Sheets

HONEYCOMB STRUCTURE

TECHNICAL FIELD

The present invention relates to a honeycomb structure. Particularly, it relates to a honeycomb structure that is suitable for use in application of supporting a catalyst for exhaust gas purification and rapidly increasing a temperature to an activation temperature of the catalyst.

BACKGROUND ART

Conventionally, a catalyst supported on a columnar honeycomb structure including a plurality of partition walls that partition and form a plurality of cells penetrating from one bottom surface to another bottom surface to form flow paths is used for purifying harmful substances such as HC, CO, and NOx contained in an exhaust gas discharged from an engine of a motor vehicle or the like. Thus, when treating the exhaust gas with the catalyst supported on the honeycomb structure, a temperature of the catalyst should be increased to its activation temperature. However, there has been a problem that since the catalyst does not reach the activation temperature at starting of the engine, the exhaust gas is not sufficiently purified. In particular, a plug-in hybrid vehicle (PHEV) and a hybrid vehicle (HV) may run only with the motor for its traveling, so that engine starting frequency is less and the catalyst temperature at starting of the engine is low, thereby tending to deteriorate the exhaust gas purification performance immediately after the engine is started.

In order to solve the problem, an electric heating catalyst (EHC) has been proposed. The EHC is configured to be capable of heating the catalyst to the activation temperature before starting of the engine by connecting a pair of terminals to a columnar honeycomb structure made of conductive ceramics and causing the honeycomb structure itself to generate heat by applying electric current. In the EHC, it is desired to provide a uniform temperature distribution by reducing temperature variation in the honeycomb structure in order to obtain a sufficient catalytic effect.

Japanese Patent Application Laid-open Publication No. 2010-229976 A (Patent Document 1) proposes a honeycomb structure comprising electrode portions on both end surface sides, which have lower volume resistivity, and heating portions on the inner side, which have higher volume resistivity, in a honeycomb body for electrification and heat generation, for the purpose of uniform heating of the honeycomb structure.

Japanese Patent Application Laid-open Publication No. 2012-188958 A (Patent Document 2) proposes to provide electrodes at opposing positions across a catalyst carrier, when viewed from the cross section orthogonal to the flow direction of an exhaust gas, in order to uniformly heat the catalyst carrier. Further, it proposes that the catalyst carrier is provided with a plurality of partition portions by partitioning the catalyst carrier in a direction orthogonal to the electrode central line, and these partition portions have each different volume resistivity so that the amount of heat generated by energization becomes close to uniformity at each part of the catalyst carrier.

On the other hand, the cross-sectional shape of the cell of the honeycomb structure is mainly rectangular or hexagonal, and cells adjacent to each other are generally arranged so as to share one side, but other cross-sectional shapes are also known in the art. For example, Japanese Patent Application Laid-open Publication No. 2002-177793 A (Patent Document 3) proposes various cross-sectional shapes of the cells, for example, polygonal shapes such as square, equilateral triangle, regular hexagon, rectangle and isosceles triangle shapes, a shape combining other shapes within a regular hexagon, an L-shape, a convex shape, a cross shape, an S-shape, a drum shape, and the like, because the cross-sectional shapes of the cells are complicated, so that the flow of the exhaust gas tends to be disturbed and the purification performance is improved.

Further, Japanese Patent Application Laid-open Publication No. 2006-224031 A (Patent Document 4) proposes that at least one side of a cell is adjacent to at least two cells via the one side. It discloses that according to such an arrangement, the number of portions where the partition walls of the four adjacent cells intersect with one another (intersect in the form of a cross or diagonal) is decreased, as compared with the conventional carrier substrate for an exhaust gas purification catalyst in which the partition walls intersect in a lattice pattern. The patent document also discloses that consequently, concentration of stress caused by thermal expansion of the carrier substrate for the exhaust gas purification catalyst can be relieved, thereby suppressing generation of breakage of the carrier substrate.

Japanese Patent Application Laid-open Publication No. 2016-196868 A (Patent Document 5) proposes a ceramic honeycomb structure comprising a main body having a cylindrical outer wall; and a plurality of cells which are partitioned inside the main body and which are continuous along the longitudinal direction of the main body, wherein each cell is partitioned by a pair of arc walls that is concentric with the outer wall and by a pair of straight walls that is along the radial direction of the outer wall, and wherein in a cross section taken perpendicularly to the longitudinal direction of the main body, the shortest radial path length between a center of the main body and the outer wall via at least one of the arc wall and the straight wall is larger than an outer shell radial dimension which is a radius of the cylinder that is the outer shape of the main body. The patent document describes the following effects produced by the ceramic honeycomb structure. Since the inner cells and the outer cells which are adjacent to each other in the radial direction of the main body are arranged so as to be displaced from each other, significant expansion and contraction in the radial direction will not occur due to heat even if there is a sudden temperature rise or temperature drop, and sufficient strength against compressive force or tensile force can be obtained. Further, since the inner cells and the outer cells are arranged so as to be displaced from each other, the shortest radial path length between the center of the main body and the outer wall via the arc wall and the straight wall will be increased and a energization path will become longer, so that the honeycomb structure can be suitably used for an electrically heated type catalyst (EHC).

CITATION LIST

Patent Literatures

Patent Document 1: Japanese Patent Application Laid-open Publication No. 2010-229976 A Patent Document 2: Japanese Patent Application Laid-open Publication No. 2012-188958 A Patent Document 3: Japanese Patent Application Laid-open Publication No. 2002-177793 A Patent Document 4: Japanese Patent Application Laid-open Publication No. 2006-224031 A Patent Document 5: Japanese Patent Application Laid-open Publication No. 2016-196868 A

SUMMARY OF INVENTION

Technical Problem

The arts described in Patent Documents 1 and 2 focus on changing the volume resistivity of the material forming the honeycomb structure depending on the positions for uniform heating. However, in order to change the materials, the parts should be separately produced and joined, so that deterioration of structural reliability such as breakage at the joint parts may be caused. Therefore, it would be advantageous if the uniform heating property of the honeycomb structure can be improved by a method different from that of joining the parts with different volume resistivity.

Although Patent Documents 3 to 5 discloses the various embodiments of the shapes and arrangements of the cells, they focus on promotion of turbulence or improvement of structural strength and only provide insufficient consideration from a viewpoint of the uniform heating property. Further, the exhaust gas purification catalysts proposed in Patent Documents 3 and 4 are not for the EHC.

The present invention has been made in view of the above circumstances, and one of objects of the present invention is to provide a honeycomb structure having improved uniform heating property from a view point different from the conventional one.

Solution to Problem

As a result of intensive studies to solve the above problems, the present inventor has found that the uniform heating property is significantly promoted by constructing a shape and arrangement of the cells in the columnar honeycomb structure in view of positional relationship of a pair of terminals.

The present invention has been completed based on the above findings. In one aspect, the present invention provides:
a columnar honeycomb structure comprising an outer peripheral side wall having an outer peripheral side surface; a plurality of partition walls that partition and form a plurality of cells penetrating from one bottom surface to another bottom surface to form flow paths, the plurality of partition walls being disposed inside the outer peripheral side wall; and a pair of terminal connection portions arranged so as to be opposed to each other on the outer peripheral side surface of the outer peripheral side wall, wherein the honeycomb structure satisfies a relational expression of $1.3 \leq L_2/L_1$ in which:
in a cross section perpendicular to a direction of the flow paths of the cells,
$L_1$ represents a length between two points on the outer peripheral side surface intersecting with a straight line connecting circumferential centers of the pair of terminal connection portions; and
$L_2$ represents a length of a shortest path connecting the two points through the outer peripheral side wall and the partition walls.

In one embodiment of the honeycomb structure according to the present invention, the cells adjacent to each other in a direction of the straight line connecting the circumferential centers of the pair of terminal connecting portions are partitioned by straight partition wall portions extending in a direction perpendicular to the direction of the straight line, in the cross section perpendicular to the direction of the flow paths of the cells.

In another embodiment of the honeycomb structure according to the present invention, the honeycomb structure satisfies a relational expression of $0.5 \leq L_3/L_1$, in which $L_3$ represents a total path length of the straight partition wall portions when passing through the shortest path, in the cross section perpendicular to the direction of the flow paths of the cells.

In yet another embodiment of the honeycomb structure according to the present invention, each cell other than the cells adjacent to the outer circumferential side wall is partitioned by a pair of straight partition wall portions A extending in a direction of the straight line connecting the circumferential centers of the pair of terminal connection portions and by a pair of straight partition portions B extending in a direction perpendicular to the straight line, in the cross section perpendicular to the direction of the flow paths of the cells.

In yet another embodiment of the honeycomb structure according to the present invention, the pair of partition wall portions A of each of the cells adjacent to each other in the direction of the straight line connecting the circumferential centers of the pair of terminal connection portions is present on straight lines different from each other, in the cross section perpendicular to the direction of the flow paths of the cells.

In yet another embodiment of the honeycomb structure according to the present invention, the pair of partition wall portions B of each of the cells adjacent to each other in the direction perpendicular to the direction of the straight line connecting the circumferential centers of the pair of terminal connection portions is present on a pair of the same straight lines, in the cross section perpendicular to the direction of the flow paths of the cells.

In yet another embodiment of the honeycomb structure according to the present invention, the lengths of the partition wall portions A of the respective cells are identical except for the cells adjacent to the outer peripheral side wall, and the lengths of the partition wall portions B of the respective cells become shorter for the cells having a longer distance from the straight line connecting the circumferential centers of the pair of terminal connection portions, in the cross section perpendicular to the direction of the flow paths of the cells.

In yet another embodiment of the honeycomb structure according to the present invention, the honeycomb structure comprises a cell structure that is line symmetric with the straight line connecting the circumferential centers of the pair of terminal connection portions as a symmetry axis, in the cross section perpendicular to the direction of the flow paths of the cells.

Advantageous Effects of Invention

According to the present invention, a honeycomb structure having significantly improved heat generation uniformity can be obtained by improving a shape and array of cells of the columnar honeycomb structure depending on positions of a pair of terminals without employing a method of joining parts having different volume resistivity. According to an embodiment of the present invention, the heat generation uniformity of the honeycomb structure can be enhanced without sacrificing structural reliability of the joint parts, which may cause a problem when joining the parts having different volume resistivity.

BRIEF DESCRIPTION OF DRAWINGS

FIG. 1-1 shows a schematic side view of a honeycomb structure according to one embodiment of the present invention.

FIG. 1-2 shows a schematic bottom view of a honeycomb structure according to one embodiment of the present invention.

FIG. 1-3 shows a partial schematic view of a cross-sectional structure of cells of a honeycomb structure according to one embodiment of the present invention.

FIG. 4-1 shows a partial structure of a cell cross section according to Comparative Example 1.

FIG. 4-2 shows a partial structure of a cell cross section according to Example 1.

FIG. 4-3 shows a partial structure of a cell cross section according to Example 2.

DESCRIPTION OF THE PREFERRED EMBODIMENTS

Embodiments for carrying out the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

<1. Honeycomb Structure>

Figure 11:
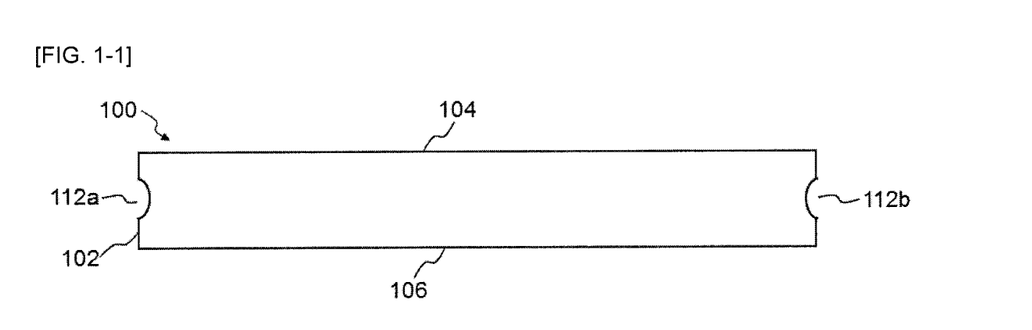
Figure 12:
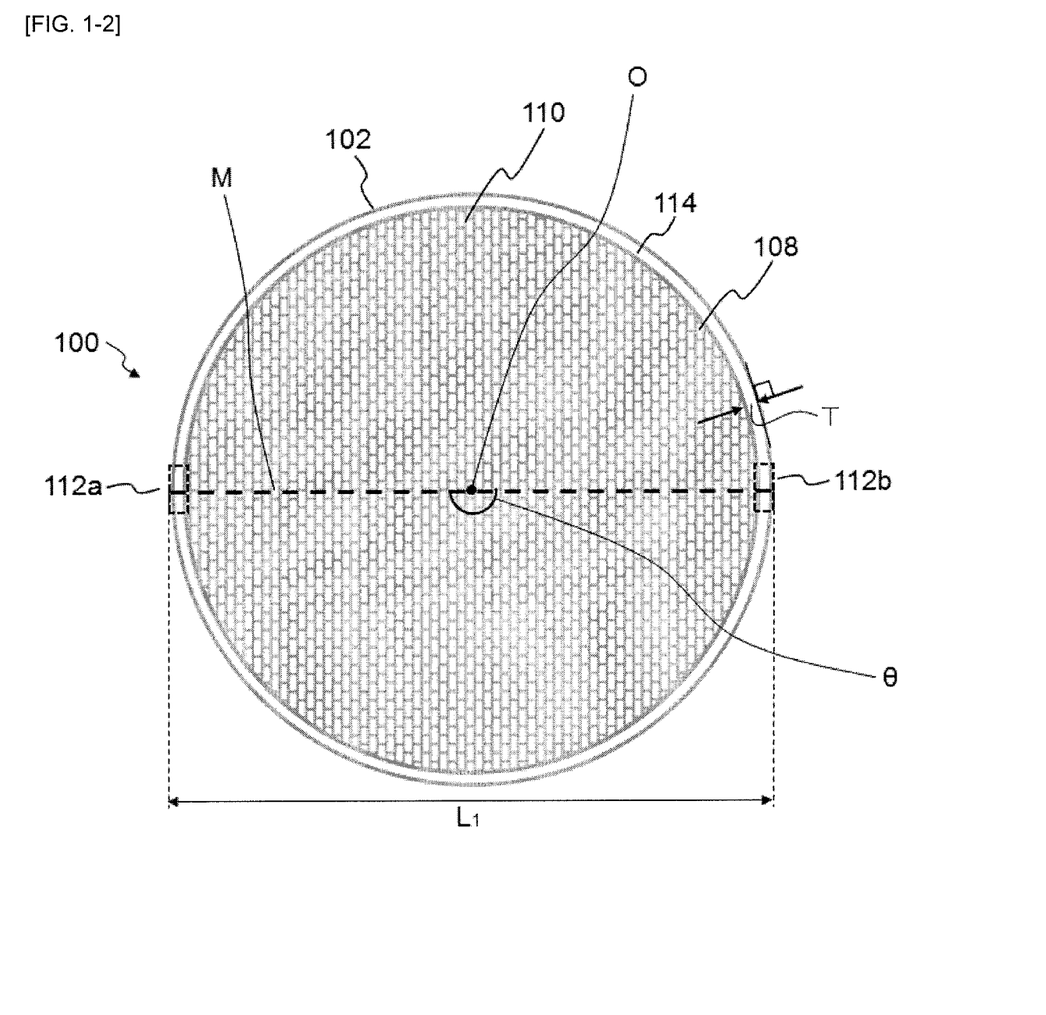
Figure 13:
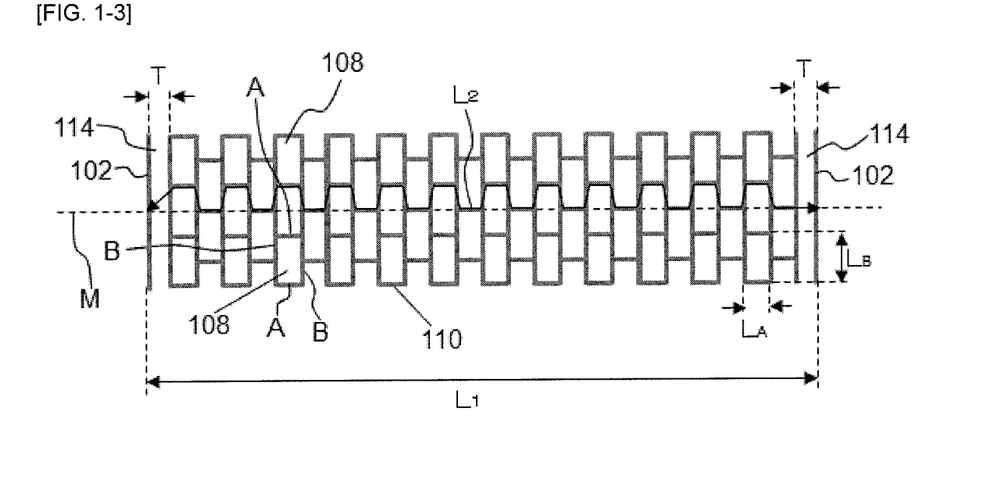

FIG. 1-1 shows a schematic side view of a honeycomb structure 100 according to one embodiment of the present invention. FIG. 1-2 shows a schematic bottom view of the honeycomb structure 100 according to one embodiment of the present invention. FIG. 1-3 shows a partial schematic view of a cross-sectional structure of cells of the honeycomb structure 100 according to one embodiment of the present invention. It should be noted that FIGS. 1-1 to 1-3 are merely schematic views for explanation and lack accuracy in dimensions, scales and the like. The entire honeycomb structure 100 may have a columnar shape, and includes an outer peripheral side wall 114 having an outer peripheral side surface 102; a plurality of partition walls 110 which is disposed inside the outer peripheral side wall 114 and which partition and form a plurality of cells 108 penetrating from a first bottom surface 104 to a second bottom surface 106 to form flow paths; and a pair of terminal connection portions 112a, 112b arranged on the outer peripheral side wall 114.

The honeycomb structure 100 may be made of a material having electric conductivity. When terminals are connected to the terminal connecting portions 112a, 112b and a voltage is applied between the terminal connecting portions 112a and 112b, electricity can be supplied for energization to generate heat due to Joule heat. Therefore, the honeycomb structure 100 can be suitably used as a heater. The voltage to be applied may preferably be from 12 to 900 V, and more preferably from 64 to 600 V, but the voltage to be applied may be changed as needed. Further, the honeycomb structure 100 may be used as a catalyst body by supporting a catalyst on the honeycomb structure 100. For example, a fluid such as an automobile exhaust gas can flow through the flow paths of the plurality of cells 108.

The form of the terminal connecting portions 112a, 112b is not particularly limited as long as they can be connected to the terminals, and in the present embodiment, each of the terminal connecting portions 112a, 112b is drilled on the outer peripheral side surface 104 such that it is easy to insert the terminals to fix them. Each of the terminal connecting portions 112a, 112 b may have a female screw shape. In the schematic bottom view of FIG. 1-2, the pair of terminal connecting portions 112a, 112b are hidden and cannot be seen, and so their positions are indicated by dotted lines.

Referring to FIG. 1-2, the pair of terminal connecting portions 112a, 112b may be preferably disposed so as to be opposed to each other across a central axis O of the honeycomb structure 100 when the honeycomb structure 100 is viewed from its bottom, in terms of uniform heating. More particularly, when the honeycomb structure 100 is viewed from its bottom, an angle θ (0°≤θ≤180°) formed by two line segments extending from the respective circumferential centers of the pair of terminal connecting portions 112 a, 112b to the central axis O of the honeycomb structure may preferably be 150°≤θ≤180°, and more preferably 160°≤θ≤180°, and even more preferably 170°≤θ≤180°, and most preferably 180°.

When a voltage is applied between the terminal connecting portions 112a and 112b, a heating rate will tend to be higher near a straight line M connecting the circumferential centers of the pair of terminal connecting portions 112a, 112b, and the heating rate will tend to be lower as getting away from the straight line M in the perpendicular direction, because electricity preferentially flows through a path with the lowest resistance. Therefore, in the present embodiment, the electric resistance near the straight line M is increased by lengthening the shortest path of electricity between the pair of terminal connecting portions 112a and 112b. This can lead to a decrease in the current near the straight line M and an increase in the current at a position that is away from the straight line M, so that the uniform heating property of the honeycomb structure can be enhanced.

More particularly, the honeycomb structure 100 according to the present embodiment satisfies a relational expression of $1.3 \leq L_2/L_1$, in which, in a cross section perpendicular to the direction of the flow paths of the cells 108, $L_1$ represents a length between two points on the outer circumferential side surface 102, which intersect with the straight line M connecting the circumferential centers of the pair of terminal connection portions 112a, 112b; and $L_2$ represents a length of the shortest path connecting the two points through the outer peripheral side wall 114 and the partition walls 110 (see FIG. 1-3). In FIG. 1-3, a bold solid line running in a zigzag manner represents the shortest path. It should be note that in FIG. 1-3, the two shortest path routes are present symmetrically with respect to the straight line M.

In order to improve the uniform heating property, the relational expression may preferably be $1.3 \leq L_2/L_1$, and more preferably $1.8 \leq L_2/L_1$, and even more preferably $2.3 \leq L_2/L_1$. However, if the ratio $L_2/L_1$ is too large, the strength against the stress applied to the direction of the straight line M of the honeycomb structure will tend to decrease. Therefore, the relational expression may preferably be $L_2/L_1 \leq 3.8$, and more preferably $L_2/L_1 \leq 3.3$, and even more preferably $L_2/L_1 \leq 2.8$, in terms of ensuring the strength.

It is preferable to have a conductive path extending in the direction perpendicular to the straight line M in the cross section perpendicular to the direction of the flow paths of the cells, in terms of lengthening the shortest path through the outer peripheral side wall 114 and the partition walls 110. Therefore, in one embodiment of the honeycomb structure according to the present invention, the cells 108 adjacent in the direction of the straight line M connecting the circumferential centers of the pair of terminal connection portions are partitioned by straight partition wall portions B extending in the direction perpendicular to the direction of the straight line M, in the cross section perpendicular to the direction of the flow paths of the cells (see FIG. 1-3).

Further, in terms of lengthening the shortest path, the honeycomb structure may preferably satisfy a relational expression of $0.5 \leq L_3/L_1$, and more preferably $0.8 \leq L_3/L_1$, and even more preferably $1.0 \leq L_3/L_1$, and even more preferably $1.5 \leq L_3/L_1$, and still more preferably $2.0 \leq L_3/L_1$, in which, in the cross section perpendicular to the direction of the flow paths of the cells, $L_3$ represents a total path length of the straight partition wall portions B when passing through the shortest path. However, if the ratio $L_3/L_1$ is too large, the strength against the stress applied to the direction of the straight line M of the honeycomb structure will tend to decrease. Therefore, in terms of ensuring the strength, the relational expression may preferably be $L_3/L_1 \leq 2.6$, and more preferably $L_3/L_1 \leq 2.4$, and even more preferably $L_3/L_1 \leq 2.2$. In FIG. 1-3, $L_3$ is equal to a length obtained by deducting from $L_2$ the path length passing through the outer peripheral side wall 114 and the path length passing through the partition wall portions A as will be described below.

The shape of the cell in the cross section perpendicular to the direction of the flow paths of the cells includes, but not limited to, preferably a square, a hexagon, an octagon, or a combination thereof. Among them, square and hexagonal shapes are preferable. Such a cell shape will result in decreased pressure loss when the exhaust gas flows through the honeycomb structure, thereby providing improved purification performance of the catalyst. The rectangle is particularly preferable from the viewpoint of tending to achieve both of the structural strength and the heating uniformity.

It is important to determine an arrangement direction or shapes of the cells taking the positions of the terminal connection portions into account, in order to improve the uniform heating property. More particularly, referring to FIG. 1-3, each cell 108 other than the cells adjacent to the outer peripheral side wall may be preferably partitioned by the pair of straight partition wall portions A extending in the direction of the straight line M connecting the circumferential centers of the pair of terminal connection portions 112a, 112b and by the pair of straight partition wall portions B extending in the direction perpendicular to the direction of the straight line M, in the cross section perpendicular to the direction of the flow paths of the cells. In addition, the reason why each cell is "other than the cells adjacent to the outer peripheral side wall" is that at least a part of the cells adjacent to the outer peripheral side wall is partitioned by the outer peripheral side wall, and is not partitioned only by the partition walls.

In the cells near the straight line M, more particularly, in the cells crossed by the straight line M or the cells adjacent to the straight line M, a ratio of a length $L_B$ of the partition wall portion B to a length $L_A$ of the partition wall portion A ($L_B/L_A$) may preferably be $1.5 \leq L_B/L_A$, and more preferably $2.0 \leq L_B/L_A$, and even more preferably $2.5 \leq L_B/L_A$, in terms of facilitating the heating of a part that is distant in the direction perpendicular to the direction of the straight line M. However, if the ratio $L_B/L_A$ is too large, the strength against the stress applied to the direction of the straight line M of the honeycomb structure will tend to decrease. Therefore, the ratio may preferably be $L_B/L_A \leq 4.0$, and more preferably $L_B/L_A \leq 3.5$, and even more preferably $L_B/L_A \leq 3.0$, in terms of ensuring the strength. In the present specification, $L_A$ and $L_B$ are measured by regarding intersections of respective center lines $C_A$ and $C_B$ of the partition wall portions A and the partition wall portions B as their end points, as shown in FIG. 2.

Figure 2:
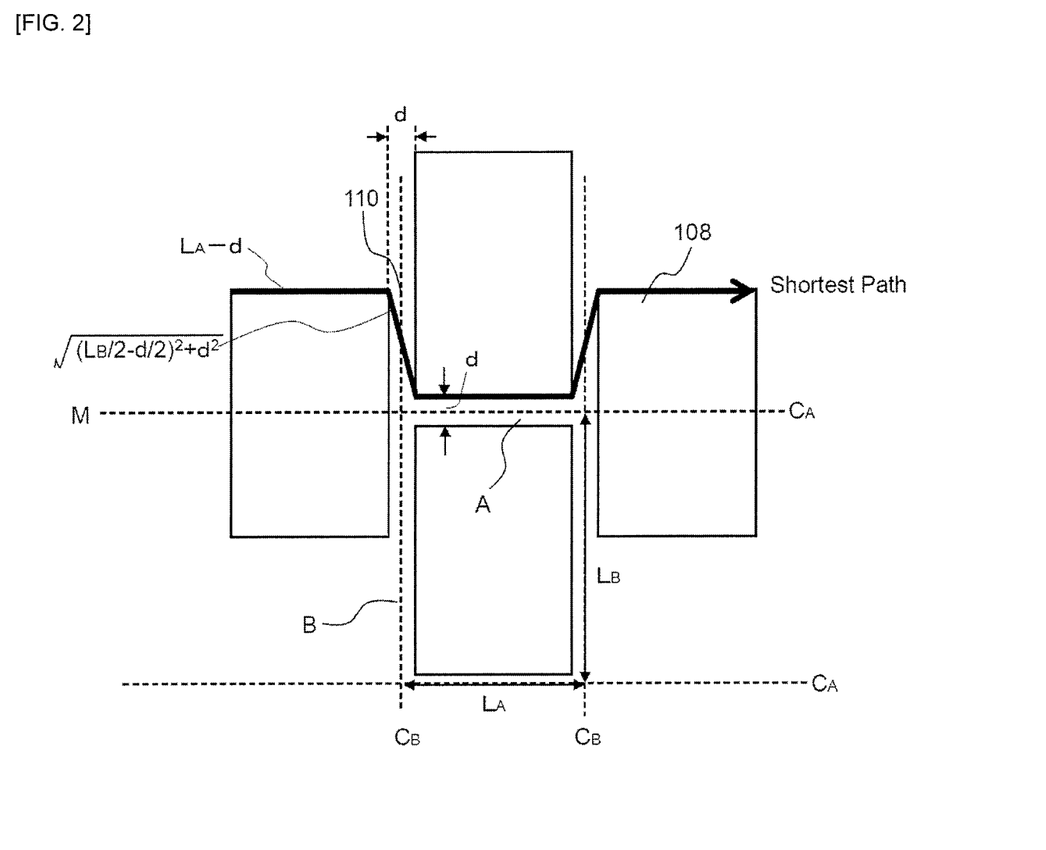
FIG. 2 shows a view for explaining definitions of a length $L_A$ of a partition wall portion A and a length $L_B$ of a partition wall portion B.

In FIGS. 1-3 and 2, when a thickness of the outer peripheral side wall 114 is defined as T, a thickness of the partition wall 110 is defined as d and sizes of all the cells are identical, the shortest path $L_2$ is represented by a sum of the following (1) to (4):

(1) the shortest path from an intersection of the straight line M with the outer peripheral side surface on the left side to the partition wall portion A of the cell that is the closest to the intersection $= (T^2 + (L_B/2)^2)^{1/2}$;

(2) a total length of the partition wall portions A in the straight line M direction in the shortest path $= (L_A - d) \times$ (the number of the partition wall portions A through which the shortest path passes) (see FIG. 2 for details);

(3) a total path length $L_3$ of the partition wall portions B $= ((L_B/2 - d/2)^2 + d^2)^{1/2} \times$ (the number of the partition wall portions B through which the shortest path passes) (see FIG. 2 for details); and (4) the shortest path from an intersection of the straight line M with the outer circumferential side surface on the right side to the partition wall portion A of the cell that is the closest to the intersection $= T$.

Further, in the cross section perpendicular to the direction of the flow paths of the cells 108, the pair of partition wall portions A of each of the cells 108 adjacent to each other in the direction of the straight line M connecting the circumferential centers of the pair of terminal connection portions 112a, 112b may be preferably present on straight lines different from each other. By such a cell arrangement, electricity cannot flow in a straight line along the straight line M between the pair of terminal connection portions 112a and 112b, and has to flow in the direction perpendicular to the straight line M. That is, when a voltage is applied between the pair of terminal connecting portions 112a and 112b, electricity will flow through the partition walls 110 in a zigzag manner, in the cross section perpendicular to the direction of the flow paths of the cells 108. This will facilitate the heating in the direction perpendicular to the straight line M, thereby improving the uniform heating property of the honeycomb structure.

In the cross section perpendicular to the direction of the flow paths of the cells 108, the pair of partition wall portions B of each of the cells 108 adjacent to each other in the direction perpendicular to the direction of the straight line M connecting the circumferential centers of the pair of terminal connection portions 112a, 112b may be preferably present on a pair of the same straight lines. By such a cell arrangement, electricity will tend to flow in the direction perpendicular to the straight line M, so that the heating of the part that is away from the straight line M in the perpendicular direction will be facilitated and the uniform heating property of the honeycomb structure will be enhanced.

As described above, the part that is away from the straight line M in the perpendicular direction is difficult to be heated. However, when the cell density of the part that is away from the straight line M in the perpendicular direction is increased, current paths of the portion will be increased, so that the part will tend to be heated. Therefore, in one embodiment of the honeycomb structure according to the present invention, the lengths $L_A$ of the partition wall portions A of the respective cells 108 are identical with the exception of the cells adjacent to the outer circumference side wall 114, and the lengths $L_B$ of the partition wall portions B of the respective cells 108 are shorter for the cells 108 having a longer distance from the straight line M connecting the circumferential centers of the pair of terminal connection portions 112a, 112b, in the cross section perpendicular to the direction of the flow paths of the cells 108.

Specifically, the $L_B$ of the cells adjacent to each other in the direction perpendicular to the straight line M may be preferably decreased by 1% or more, and more preferably by 3% or more, and even more preferably by 5% or more, as getting away from the straight line M by one cell. However, if the decreasing rate is too large, the cell density of the cells present at positions that are away from the straight line M in the perpendicular direction will become too high and the strength will become high, so that deformation will be difficult during heating and cracking will tend to occur. Thus, the decreasing rate of $L_B$ of the cells adjacent to each other in the direction perpendicular to the straight line M as getting way from the straight line by one cell may be 10% or less, and more preferably 8% or less, and even more preferably 6% or less.

In terms of improving the uniform heating property, the honeycomb structure 100 preferably includes a cell structure that is line symmetric with the straight line M connecting the circumferential centers of the pair of terminal connecting portions 112a, 112b as a symmetry axis, in the cross section perpendicular to the direction of the flow paths of the cells 108. This is because the cell structure of the honeycomb structure 100 line symmetric with the straight line M as a symmetry axis will allow uniform flowing of electricity in both directions perpendicular to the straight line M (upward and downward directions in the plane of FIG. 1-2).

Figure 3:
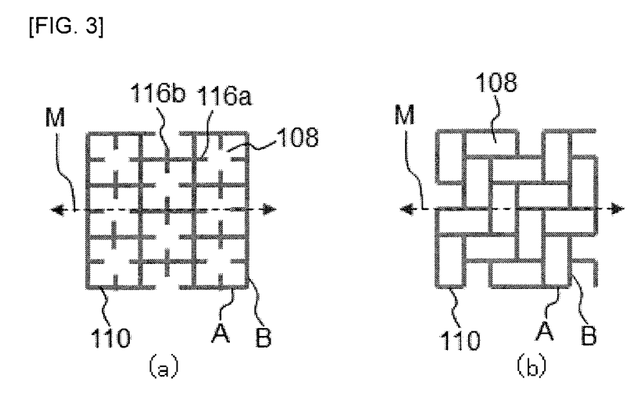
FIG. 3 shows examples of cross-sectional structures of cells of a honeycomb structure according to another embodiment of the present invention.

FIGS. 3(a) and 3(b) each shows a partial cell structure when the honeycomb structure according to another embodiment of the present invention is viewed from the cross section perpendicular to the direction of the flow paths of the cells.

In the embodiment shown in FIG. 3(a), each cell 108 has a skeleton with a square cross section, which is formed by the partition wall portions A and the partition wall portions B. Further, in the embodiment shown in FIG. 3(a), each cell 108 includes a pair of fins 116a extending from midpoints of the partition wall portions B toward the inner side of the cell 108 in the direction parallel to the direction of the straight line M; and a pair of fins 116b extending from midpoints of the partition wall portions A toward the inner side of the cell 108 in the direction perpendicular to the direction of the straight line M. The pair of fins 116a and the pair of fins 116b are opposed to each other at a predetermined interval and are not in contact with each other.

Even in the embodiment shown in FIG. 3(a), the pair of partition wall portions A of each of the cells 108 adjacent to each other in the direction of the straight line M connecting the circumferential centers of the pair of terminal connection portions 112a, 112b is present on straight lines different from each other, in the cross section perpendicular to the direction of the flow paths of the cells 108. Therefore, when a voltage is applied between the pair of terminal connection portions 112a and 112b, electricity will flow through the partition walls 110 in a zigzag manner, in the cross section perpendicular to the direction of the flow paths of the cells 108. This will facilitate the heating in the direction perpendicular to the straight line M and enhance the uniform heating property of the honeycomb structure.

In the embodiment shown in FIG. 3(b), each cell 108 has a skeleton with a rectangular cross section, which is formed by the partition wall portions A and the partition wall portions B. In the embodiment shown in FIG. 3(b), two cells having reversed lengths of the partition wall portions A and the partition wall portions B are alternately arranged in the directions parallel to and perpendicular to the direction of the straight line M, respectively. Therefore, when a voltage is applied between the pair of terminal connection portions 112a and 112b, electricity will flow through the partition walls 110 in a zigzag manner, in the cross section perpendicular to the direction of the flow paths of the cells 108. This will facilitate the heating in the direction perpendicular to the straight line M and enhance the uniform heating property of the honeycomb structure.

Each thickness d of the partition walls 110 for partitioning and forming the cells 108 may preferably be from 0.1 to 0.3 mm, and more preferably from 0.15 to 0.25 mm. The thickness d of the partition walls 110 of 0.1 mm or more will allow suppression of a decrease in the strength of the honeycomb structure. The thickness d of the partition walls 110 of 0.3 mm or less will allow suppression of an increase in pressure loss during flowing of exhaust gas when the catalyst is supported using the honeycomb structure 100 as a catalyst carrier. In the present invention, the thickness d of the partition walls 110 is defined as a length of a portion passing through the partition walls 110, among the line segments connecting the centers of gravity of adjacent cells 108, in the cross section perpendicular to the flow paths of the cells 108.

From the viewpoint of improving the uniform heating property of the honeycomb structure 100, a method of changing the thickness of the partition walls 110 depending on the positions may be additionally adopted. For example, it is considered that electric resistance is increased by reducing the thickness of the partition walls 110 near the straight line M connecting the circumferential centers of the pair of terminal connection portions 112a, 112b when the honeycomb structure 100 is viewed from its bottom. However, the method of changing the thickness of the partition walls 110 depending on the positions would generate an intensity distribution within the honeycomb structure. Therefore, in one embodiment of the honeycomb structure according to the present invention, each of the partition walls 110 possessed by the honeycomb structure 100 has a thickness within ±10%, preferably within ±5% of the average thickness of the partition walls 110.

In the cross section perpendicular to the flow path direction of the cells 108, the honeycomb structure 100 may preferably have a cell density of from 40 to 150 cells/cm$^2$, and more preferably from 70 to 100 cells/cm$^2$. The cell density in such a range will allow the purification performance of the catalyst to be improved in a state where the pressure loss is reduced during flowing of the exhaust gas. If the cell density is lower than 40 cells/cm$^2$, the catalyst supporting area may be reduced. If the cell density is higher than 150 cells/cm$^2$, the pressure loss during flowing the exhaust gas may become large when the catalyst is supported using the honeycomb structure 100 as a catalyst carrier.

Providing the outer peripheral side wall 114 of the honeycomb structure 100 is useful in terms of ensuring the structural strength of the honeycomb structure 100 and preventing the fluid flowing through the cells 108 from leaking from the outer peripheral side surface 102. More particularly, a thickness T of the outer peripheral side wall 114 may preferably be 0.1 mm or more, and more preferably 0.15 mm or more, and still more preferably 0.2 mm or more. However, if the thickness of the outer peripheral side wall 114 is excessively high, the strength will become too high, so that balance between strengths of the outer peripheral side wall and the partition walls 110 will be lost and a thermal shock resistance will be decreased. Therefore, the thickness T of the outer peripheral side wall 114 may preferably be 1.0 mm or less, and more preferably 0.7 mm or less, and still more preferably 0.5 mm or less. Here, the thickness T of the outer circumferential side wall 114 is defined as a thickness of the outer peripheral side surface at a position relative to a tangential line in the normal direction, which position is to measure the thickness of the outer peripheral side wall 114, when observed at a cross section perpendicular to the flow path direction of the cells. FIG. 1-2 exemplarily shows the position to measure the thickness T of the outer peripheral side wall 114.

The material for forming the honeycomb structure 100 is not particularly limited as long as the honeycomb structure has electrical conductivity, and metal, ceramics or the like may be used. In particular, the material of the honeycomb structure 100 is preferably based on a silicon-silicon carbide composite material or a silicon carbide, and more preferably may be a silicon-silicon carbide composite material or silicon carbide, in terms of compatibility of heat resistance and electrical conductivity. The phrase "the material of the honeycomb structure 100 is based on a silicon-silicon carbide composite material" as used herein means that the honeycomb structure 100 contains 90% by mass or more of the silicon-silicon carbide composite material (total mass). Here, the silicon-silicon carbide composite material contains silicon carbide particles as an aggregate and silicon as a binder for bonding the silicon carbide particles to each other, and it is preferable that the silicon carbide particles are bonded by silicon such that pores are formed between the silicon carbide particles. The phrase "the material of the honeycomb structure 100 is based on silicon carbide" as used herein means that the honeycomb structure 100 contains 90% by mass or more of the entire silicon carbide (total mass).

When the material of the honeycomb structure 100 is the silicon-silicon carbide composite material, a ratio of the "mass of silicon as a binder" contained in the honeycomb structure 100 to the total of the "mass of the silicon carbide particles as an aggregate" contained in the honeycomb structure 100 and the "mass of silicon as a binder" contained in the honeycomb structure 100 may preferably be from 10 to 40% by mass, and more preferably from 15 to 35% by mass. If it is lower than 10% by mass, the strength of the honeycomb structure may be decreased. If it is higher than 40% by mass, the shape may not be retained during firing.

The honeycomb structure 100 generates heat by Joule heat, and its electric resistivity is not particularly limited, but the electrical resistivity of the honeycomb structure 100 may preferably be from 1 to 200 Ωcm, and more preferably from 10 to 100 Ωcm. Further, the electric resistivity of the honeycomb structure 100 may also be selected in accordance with the application for use in the honeycomb structure 100. In the present invention, the electric resistivity of the honeycomb structure 100 is defined as a value measured at 400° C. by a four-terminal method.

A method of changing the material of the honeycomb structure 100 depending on the positions may be additionally adopted in terms of improving uniform heating property of the honeycomb structure 100. For example, it is conceivable to increase the electric resistivity of the material forming the partition walls 110 near the straight line M connecting the circumferential centers of the pair of terminal connection portions 112a, 112b when the honeycomb structure 100 is viewed from its bottom. However, as described above, the method of changing the material of the honeycomb structure 100 depending on the positions requires joining a plurality of parts, so that the structural strength of the honeycomb structure 100 may be decreased. Therefore, in one embodiment of the honeycomb structure 100 according to the present invention, all the partition walls can be made of the same material. In another embodiment of the honeycomb structure 100 according to the present invention, all the partition walls 110 and the outer peripheral side wall 114 can be made of the same material. In a further embodiment of the honeycomb structure 100 according to the present invention, all the components can be made of the same material. In this case, the honeycomb structure 100 has substantially the same material composition at any portion and can be integrally molded.

The partition wall 110 may be porous. The porosity of the partition wall 110 may preferably be from 35 to 60%, and more preferably from 35 to 45%. If the porosity is less than 35%, increased deformation may occur during firing. If the porosity exceeds 60%, the strength of the honeycomb structure may be decreased. The porosity is a value measured by a mercury porosimeter.

The mean pore diameter of the partition walls 110 of the honeycomb structure 100 may preferably be from 2 to 15 μm, and more preferably 4 to 8 μm. If the mean pore diameter is smaller than 2 μm, the electrical resistivity may become too high. If the mean pore diameter is larger than 15 μm, the electrical resistivity may become too small. The mean pore diameter is a value measured by a mercury porosimeter.

The external shape of the honeycomb structure 100 is not particularly limited as long as it is columnar. For example, the external shape of the honeycomb structure 100 may be a columnar shape with circular bottoms (cylindrical shape), a columnar shape with oval bottom shapes, a columnar shape with polygonal bottom shapes (quadrangle, pentagon, hexagon, heptagon and octagon shapes, etc.), or the like. For the size of the honeycomb structure 100, an area of the bottom surface may preferably be from 2000 to 20000 mm$^2$, and more preferably from 5000 to 15000 mm$^2$, for the reason of heat resistance (cracks generated in the outer wall portion in the outer peripheral direction).

<2. Method for Producing Honeycomb Structure>

Next, while a method for producing the honeycomb structure according to the present invention will be exemplarily described, the method of producing the honeycomb structure according to the present invention is not limited to the producing method as described below. In one embodiment, the method for producing the honeycomb structure according to the present invention includes a step of providing a honeycomb formed body and a step of firing the honeycomb formed body.

The honeycomb formed body can be produced in accordance with a method for making a honeycomb formed body in the known method for producing the honeycomb structure. For example, firstly, a molding material is prepared by adding metallic silicon powder (metallic silicon), a binder, a surfactant, a pore former, water and the like to silicon carbide powder (silicon carbide). The mass of metallic silicon may preferably be from 10 to 40% by mass relative to the sum of the mass of silicon carbide powder and the mass of metallic silicon. The mean particle diameter of the silicon carbide particles in the silicon carbide powder may preferably be from 3 to 50 µm, and more preferably from 3 to 40 µm. The mean particle diameter of metallic silicon (metallic silicon powder) may preferably be from 2 to 35 µm. Each of the mean particle diameter of the silicon carbide particles and metallic silicon (metallic silicon particles) refers to an arithmetic mean diameter on volume basis when frequency distribution of the particle size is measured by a laser diffraction method. The silicon carbide particles are fine particles of silicon carbide forming the silicon carbide powder, and the metallic silicon particles are fine particles of metallic silicon forming the metal silicon powder. It should be noted that this is the formulation of the molding material when the material of the honeycomb structure is the silicon-silicon carbide based composite material, and no metallic silicon is added when the material of the honeycomb structure is silicon carbide.

Examples of the binder include methyl cellulose, hydroxypropyl methyl cellulose, hydroxypropoxyl cellulose, hydroxyethyl cellulose, carboxymethyl cellulose, polyvinyl alcohol, and the like. Among them, it is preferable to use methyl cellulose in combination with hydroxypropoxyl cellulose. The content of the binder may preferably be from 2.0 to 10.0 parts by mass provided that the total mass of the silicon carbide powder and the metallic silicon powder is 100 parts by mass.

The content of water may preferably be from 20 to 60 parts by mass provided that the total mass of the silicon carbide powder and the metallic silicon powder is 100 parts by mass.

Examples of the surfactant that can be used include ethylene glycol, dextrin, fatty acid soap, polyalcohol and the like. These may be used alone or in combination with two or more. The content of the surfactant may preferably be from 0.1 to 2.0 parts by mass provided that the total mass of the silicon carbide powder and the metallic silicon powder is 100 parts by mass.

The pore former is not particularly limited as long as it will form pores after firing, and includes, for example, graphite, starches, foaming resins, water absorbing resins, silica gel and the like. The content of the pore former may preferably be from 0.5 to 10.0 parts by mass provided that the total mass of the silicon carbide powder and the metallic silicon powder is 100 parts by mass. The mean particle diameter of the pore former may preferably be from 10 to 30 µm. If it is smaller than 10 µm, pores may not be formed sufficiently. If it is larger than 30 µm, the die may be clogged with the pore former during molding. The mean particle diameter of the pore former refers to an arithmetic mean diameter on volume basis when the frequency distribution of the particle size is measured by a laser diffraction method. When the pore former is the water absorbing resin, the mean particle diameter of the pore former refers to the mean particle diameter after water absorption.

Subsequently, the resulting molding material is kneaded to form a green body, and the green body is then subjected to extrusion molding to prepare a honeycomb formed body including partition walls and an outer peripheral side wall. In the extrusion molding, a die having a desired overall shape, cell shape, partition wall thickness, cell density and the like can be used. The resulting honeycomb formed body is preferably subjected to drying. Hereinafter, the dried honeycomb formed body may be referred to as a "honeycomb dried body". When the length in the central axis direction of the honeycomb formed body (or the honeycomb dried body) is not a desired length, both the bottom portions of the honeycomb formed body can be cut to the desired length.

On the outer peripheral side surface of the honeycomb formed body thus obtained, the pair of terminal connecting portions can be then formed by a piercing machine or the like. The pair of terminal connecting portions may be formed after firing. However, the pair or terminal connecting portions may be preferably formed prior to firing, because there is concern about an increase in an amount of waste materials and abrasion of a polishing jig.

The honeycomb formed body is then fired to obtain a honeycomb fired body. Before carrying out the firing, the honeycomb formed body may be dried. Further, before the firing, degreasing may be performed in order to remove the binder and the like in the raw material. The firing may be preferably carried out by heating the honeycomb formed body in an inert atmosphere such as nitrogen or argon at 1400 to 1500° C. for 1 to 20 hours. After the firing, an oxidation treatment may be preferably carried out at 1200 to 1350° C. for 1 to 10 hours in order to improve the durability. The degreasing and firing methods are not particularly limited, and the firing may be carried out using an electric furnace, a gas furnace or the like.

EXAMPLES

Hereinafter, Examples will be illustrated for better understanding of the present invention and its advantages, but the present invention is not limited to the Examples.

Comparative Example 1

(1. Preparation of Columnar Green Body)

A ceramic raw material was prepared by mixing silicon carbide (SiC) powder and metallic silicon (Si) powder at a mass ratio of 80:20. To the ceramic raw material were added hydroxypropylmethyl cellulose as a binder and a water absorbing resin as a pore former, as well as water, to form a molding material. The molding material was then kneaded by a vacuum green body kneader to prepare a columnar green body. The content of the binder was 7 parts by mass provided that the total amount of silicon carbide (SiC) powder and metallic silicon (Si) powder was 100 parts by mass. The content of the pore former was 3 parts by mass provided that the total amount of silicon carbide (SiC) powder and metallic silicon (Si) powder was 100 parts by mass. The content of water was 42 parts by mass provided that the total amount of silicon carbide (SiC) powder and metallic silicon (Si) powder was 100 parts by mass. The mean particle diameter of silicon carbide powder was 20 µm and the mean particle diameter of metallic silicon powder was 6 µm. The mean particle diameter of the pore former was 20 µm. Each of the mean particle diameter of silicon carbide, metallic silicon and pore former refers to an arithmetic mean diameter on volume basis when the frequency distribution of particle size is measured by a laser diffraction method.

(2. Preparation of Honeycomb Dried Body)

Figure 41:
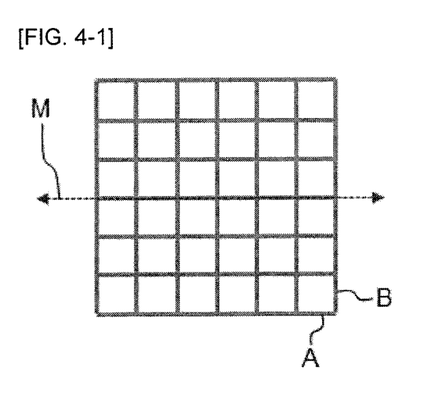

The resulting columnar green body was molded using an extruder including a grid-like die structure as shown in FIG. 4-1 to provide a columnar honeycomb formed body including cells each having a square shape in the cross section perpendicular to the flow path direction of the cells. The honeycomb formed body was subjected to high frequency induction heating and drying and then dried at 120° C. for 2 hours by using a hot air drier, and predetermined amounts of both bottom surfaces were cut to prepare a honeycomb dried body.

(3. Formation of Terminal Connection Portion)

Figure 5:
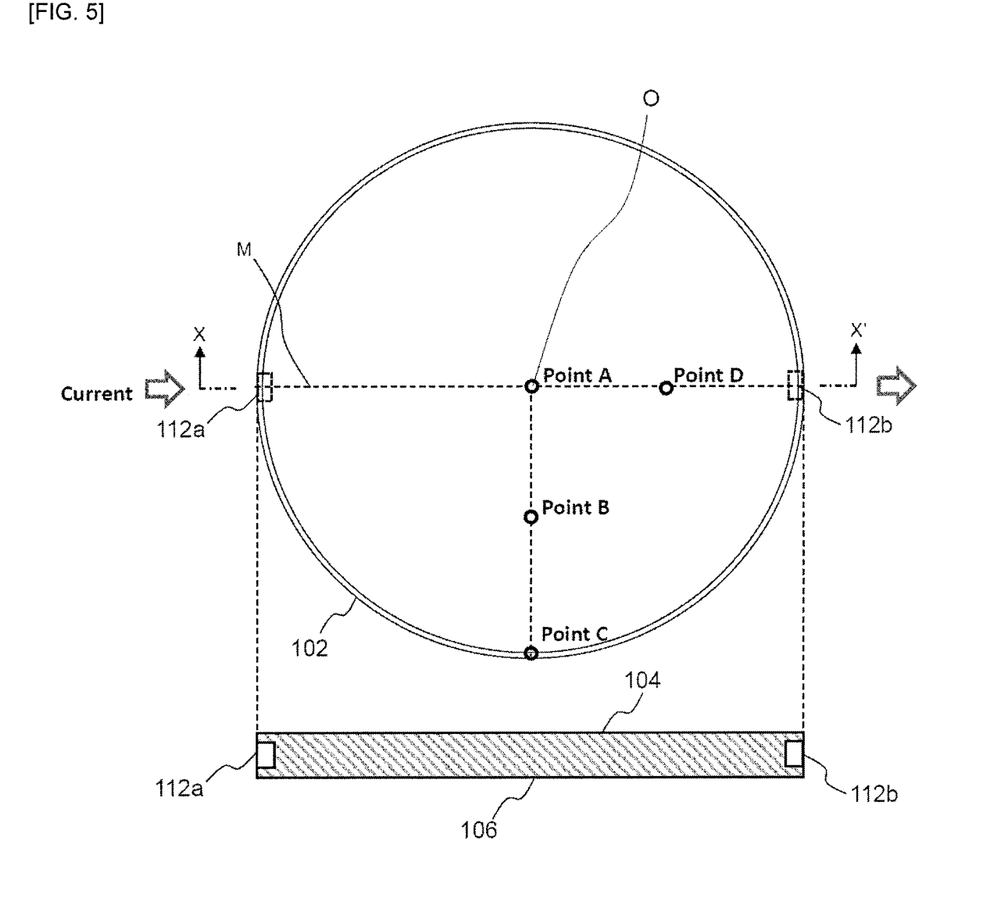
FIG. 5 shows a schematic bottom view (upper view) and a schematic cross-sectional view (lower view) taken along a line X-X' in honeycomb structures according to Examples and Comparative Example. Arrangement of a pair of terminal connection portions and temperature measurement points (points A to D) are shown.

A pair of cylindrical terminal connection portions 112a, 112b was drilled and formed at the opposing central portions in the height direction of the outer peripheral side surface 102 across the central axis O of the honeycomb dried body by a piercing machine, as shown in FIG. 5. It should be noted that in the schematic bottom view of FIG. 5, the pair of terminal connecting portions 112a, 112b is not shown because it is hidden in the inner side, and the terminal connecting portions 112a, 112b are therefore represented by dotted lines. Further, in FIG. 5, the illustration of the cell structure of the honeycomb structure is omitted for simplicity.

(4. Firing)

The honeycomb dried body was then degreased, fired and further oxidized to provide a honeycomb structure. The degreasing was carried out in an oxidizing atmosphere at 550° C. for 3 hours. The firing was carried out in an argon atmosphere at 1450° C. for 2 hours. The oxidation treatment was carried out in an oxidizing atmosphere at 1300° C. for 1 hour.

The various dimensions of the resulting honeycomb structure were substantially the same as those of the honeycomb dried body. The honeycomb structure had each bottom surface with a circular shape having a diameter of 120 mm and a height (a length in the direction of the flow paths of the cells) of 10 mm. The cell density was 62 cells/cm$^2$, the thickness of each partition wall was 0.127 mm, the porosity of the partition walls was 45%, and the mean pore diameter of the partition walls was 8.6 μm. The thickness of the outer peripheral side wall was 0.35 mm at any measurement points.

(5. Measurement of Temperature Distribution During Heating)

Temperature variation depending on the positions of the honeycomb structure was investigated for the resulting honeycomb structure when terminals were connected to the pair of terminal connecting portions 112a, 112b and a voltage was applied to both the terminals to supply electric energy (400 W) for 20 seconds. The temperature measurement points were four points A to D as shown in FIG. 5, and the temperature at each measurement point was measured when passing 20 seconds from the start of supply of electric energy. The results are shown in Table 2.

(6. Thermal Shock Resistance Test)

For the resulting honeycomb structure, the terminals were connected to the pair of terminal connecting portions 112a and 112b, respectively, and a voltage was applied to both of the terminals, and the temperature of the center axis O of the honeycomb structure when viewed from the bottom was increased to each set temperature as shown in Table 3 in 5 minutes, and then cooled to room temperature in 5 minutes. The same heating and cooling test was performed on three honeycomb structures, and the presence or absence of crack was visually confirmed for each honeycomb structure, and the number of cracks the honeycomb structures that generated crack was examined. The results are shown in Table 3.

Example 1

(1. Preparation of Columnar Green Body)

A columnar green body was prepared by the same procedures as in Comparative Example 1.

(2. Preparation of Honeycomb Dried Body)

Figure 42:
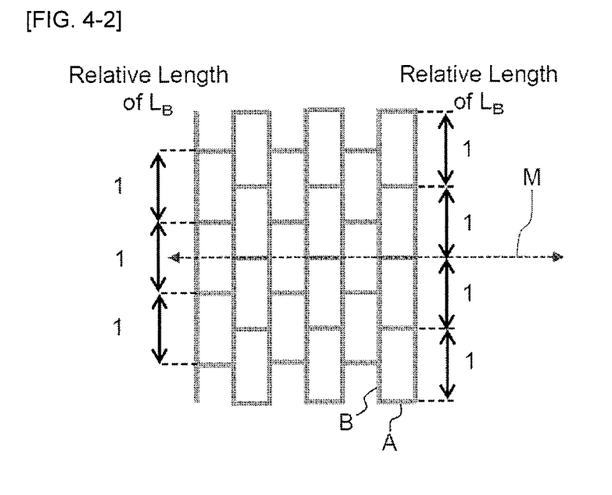

A honeycomb dried body was prepared by the same procedures as in Comparative Example 1, with the exception that a stacked brick-like die having the structure as shown in FIG. 4-2 was used.

(3. Formation of Terminal Connection Portion)

Terminal connecting portions were formed by the same procedures as in Comparative Example 1.

(4. Firing)

The honeycomb dried body was degreased, fired and further oxidized to provide a honeycomb structure by the same procedures as in Comparative Example 1.

The various dimensions of the resulting honeycomb structure were substantially the same as those of the honeycomb dried body. Parameters for the cell structure of the honeycomb structure are shown in Table 1. The meanings of the symbols in Table 1 are as described above.

$L_A$: a length of partition wall portion A;

\* The partition wall portion A refers to a straight partition wall portion extending in the direction of the straight line M connecting the circumferential centers of the pair of terminal connection portions 112a, 112b, among the partition walls that partition and form each cell.

$L_B$: a length of partition wall portion B;

\* The partition wall portion B refers to a straight partition wall portion extending in the direction perpendicular to the direction of the straight line M, among the partition walls that partition and form each cell.

$L_1$: a length between two points on the outer circumferential side surface 102 intersecting with the straight line M connecting the circumferential centers of the pair of terminal connecting portions 112a, 112b;

$L_2$: a length of the shortest path connecting the two points through the outer peripheral side wall 114 and the partition walls 110; and $L_3$: a total path length of the partition wall portions B when passing through the shortest path.

In this honeycomb structure, all the lengths $L_B$ of the cells adjacent to each other in the direction perpendicular to the straight line M connecting the circumferential centers of the pair of terminal connection portions 112a, 112b were identical regardless of a distance from M, in the cross section perpendicular to the direction of the flow paths of the cells.

(5. Measurement of Temperature Distribution During Heating)

For the resulting honeycomb structure, the temperature distribution during heating was measured in the same method as in Comparative Example 1. The results are shown in Table 2.

(6. Thermal Shock Resistance Test)

For the resulting honeycomb structure, the thermal shock resistance test was carried out in the same method as in Comparative Example 1. The results are shown in Table 3.

Example 2

(1. Preparation of Columnar Green Body)

A columnar green body was prepared by the same procedures as in Comparative Example 1.

(2. Preparation of Honeycomb Dried Body)

Figure 43:
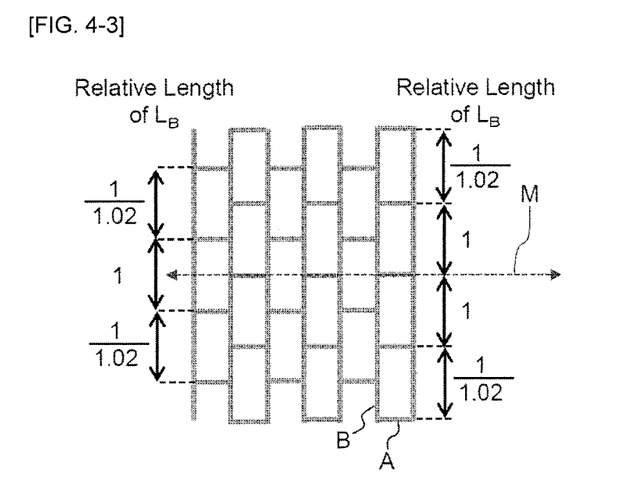

A honeycomb dried body was prepared by the same procedures as in Comparative Example 1, with the exception that a stacked brick-like die having the structure as shown in FIG. 4-3 was used.

(3. Formation of Terminal Connection Portion)

Terminal connecting portions were formed by the same procedures as in Comparative Example 1.

(4. Firing)

The honeycomb dried body was degreased, fired and further oxidized to provide a honeycomb structure by the same procedures as in Comparative Example 1.

The various dimensions of the resulting honeycomb structure were substantially the same as those of the honeycomb dried body. Parameters for the cell structure of the honeycomb structure are shown in Table 1.

In this honeycomb structure, the lengths $L_B$ of the cells adjacent to each other in the direction perpendicular to the straight line M connecting the circumferential centers of the pair of terminal connection portions 112a, 112 b are decreased to a length of 1/1.02=about 98% (i.e., a decreasing rate of 2%), as the distance from the straight line M is separated by one cell, in the cross section perpendicular to the direction of the flow paths of the cells. The value of $L_B$ of Example 2 in Table 1 indicates $L_B$ of the cell that is the closest to the straight line M (the cell crossed by the straight line M or the cell adjacent to the straight line M).

(5. Measurement of Temperature Distribution During Heating)

For the resulting honeycomb structure, the temperature distribution during heating was measured in the same method as in Comparative Example 1. The results are shown in Table 2.

(6. Thermal Shock Resistance Test)

For the resulting honeycomb structure, the thermal shock resistance test was carried out in the same method as in Comparative Example 1. The results are shown in Table 3.

Example 3

(1. Preparation of Columnar Green Body)

A columnar green body was prepared by the same procedures as in Comparative Example 1.

(2. Preparation of Honeycomb Dried Body)

A honeycomb dried body was prepared by the same procedures as in Comparative Example 1, with the exception that a stacked brick-like die having the structure as shown in FIG. 4-2 was used.

(3. Formation of Terminal Connection Portion)

Terminal connecting portions were formed by the same procedures as in Comparative Example 1.

(4. Firing)

The honeycomb dried body was degreased, fired and further oxidized to provide a honeycomb structure by the same procedures as in Comparative Example 1.

The various dimensions of the resulting honeycomb structure were substantially the same as those of the honeycomb dried body. Parameters for the cell structure of the honeycomb structure are shown in Table 1.

In this honeycomb structure, all the lengths $L_B$ of the cells adjacent to each other in the direction perpendicular to the straight line M connecting the circumferential centers of the pair of terminal connection portions 112a, 112 b were identical, regardless of the distance from M, in the cross section perpendicular to the direction of the flow paths of the cells.

(5. Measurement of Temperature Distribution During Heating)

For the resulting honeycomb structure, the temperature distribution during heating was measured in the same method as in Comparative Example 1. The results are shown in Table 2.

(6. Thermal Shock Resistance Test)

For the resulting honeycomb structure, the thermal shock resistance test was carried out in the same method as in Comparative Example 1. The results are shown in Table 3.

TABLE 1

| | Partition Wall Thickness (mm) | Outer Peripheral Side Wall Thickness (mm) | $L_A$ (mm) | $L_B$ (mm) | $L_B/L_A$ | $L_1$ (mm) | $L_2$ (mm) | $L_3$ (mm) | $L_2/L_1$ | $L_3/L_1$ | Decreasing Rate of $L_B$ |
|---|---|---|---|---|---|---|---|---|---|---|---|
| Comparative Example 1 | 0.127 | 0.35 | 1.27 | 1.27 | 1.0 | 120.0 | 120.0 | 0.0 | 1.00 | 0.00 | 0% |
| Example 1 | 0.127 | 0.35 | 1.27 | 2.54 | 2.0 | 120.0 | 225.0 | 115.3 | 1.88 | 0.96 | 0% |
| Example 2 | 0.127 | 0.35 | 1.27 | 2.54 | 2.0 | 120.0 | 225.0 | 115.3 | 1.88 | 0.96 | 2% |
| Example 3 | 0.127 | 0.35 | 1.27 | 3.81 | 3.0 | 120.0 | 285.5 | 175.4 | 2.38 | 1.46 | 0% |

*$L_B$ in Example 2 indicates $L_B$ for the cell that is the closest to the straight line M.

TABLE 2

| | Comparative Example 1 | Example 1 | Example 2 | Example 3 |
|---|---|---|---|---|
| Point A (° C.) | 359 | 376 | 366 | 363 |
| Point B (° C.) | 336 | 365 | 361 | 362 |
| Point C (° C.) | 311 | 356 | 355 | 357 |
| Point D (° C.) | 368 | 387 | 374 | 370 |
| Point A − Point C (° C.) | Δ 48 | Δ 20 | Δ 11 | Δ 6 |

TABLE 3

| | Comparative Example 1 | Example 1 | Example 2 | Example 3 |
|---|---|---|---|---|
| 600° C. | 0/3 | 0/3 | 0/3 | 0/3 |
| 700° C. | 2/3 | 0/3 | 0/3 | 0/3 |

<Discussion>

In both of Examples and Comparative Example, the heating rate was higher near the straight line M connecting the circumferential centers of the pair of terminal connecting portions, and the heating rate was slower as getting away from the straight line M in the perpendicular direction. However, it is understood the temperature difference between Point A and Point C was smaller in Examples 1 to 3 than that in Comparative Example 1 and the uniform heating property was improved. Example 2 in which $L_B$ was gradually shorter as getting away from the straight line M exhibited higher uniform heating property than Example 1. Further, Example 3 in which the ratio $L_2/L_1$ was optimized showed the best uniform heating property.

DESCRIPTION OF REFERENCE NUMERALS 100 honeycomb structure
102 outer peripheral side surface
104 first bottom surface
106 second bottom surface
108 cell
110 partition wall
112a, 112b terminal connection portion
114 outer peripheral side wall
116a, 116b fin

What is claimed is:

1. A columnar honeycomb structure comprising an outer peripheral side wall having an outer peripheral side surface; a plurality of partition walls that partition and form a plurality of cells penetrating from one bottom surface to another bottom surface to form flow paths, the plurality of partition walls being disposed inside the outer peripheral side wall; and a pair of terminal connection portions arranged so as to be opposed to each other on the outer peripheral side surface of the outer peripheral side wall, wherein the honeycomb structure satisfies a relational expression of $1.3 \leq L_2/L_1$ in which:

in a cross section perpendicular to a direction of the flow paths of the cells, $L_1$ represents a length between two points on the outer peripheral side surface intersecting with a straight line connecting circumferential centers of the pair of terminal connection portions; and $L_2$ represents a length of a shortest path connecting the two points through the outer peripheral side wall and the partition walls, and wherein the cells adjacent to each other in a direction of the straight line connecting the circumferential centers of the pair of terminal connection portions are partitioned by straight partition wall portions extending in a direction perpendicular to the direction of the straight line, in the cross section perpendicular to the direction of the flow paths of the cells.

2. A honeycomb structure according to claim 1, wherein the honeycomb structure satisfies a relational expression of $0.5 \leq L_3/L_1$, in which $L_3$ represents a total path length of the straight partition wall portions when passing through the shortest path, in the cross section perpendicular to the direction of the flow paths of the cells.

3. The honeycomb structure according to claim 1, wherein the honeycomb structure comprises a cell structure that is line symmetric with the straight line connecting the circumferential centers of the pair of terminal connection portions a symmetry axis, in the cross section perpendicular to the direction of the flow paths of the cells.

4. The honeycomb structure according to claim 1, wherein each cell other than the cells adjacent to the outer circumferential side wall is partitioned by a pair of straight partition wall portions A extending in a direction of the straight line connecting the circumferential centers of the pair of terminal connection portions and by a pair of straight partition portions B extending in a direction perpendicular to the straight line, in the cross section perpendicular to the direction of the flow paths of the cells.

5. The honeycomb structure according to claim 4, wherein the pair of partition wall portions A of each of the cells adjacent to each other in the direction of the straight line connecting the circumferential centers of the pair of terminal connection portions is present on straight lines different from each other, in the cross section perpendicular to the direction of the flow paths of the cells.

6. The honeycomb structure according to claim 4, wherein the pair of partition wall portions B of each of the cells adjacent to each other in the direction perpendicular to the direction of the straight line connecting the circumferential centers of the pair of terminal connection portions is present on a pair of the same straight lines, in the cross section perpendicular to the direction of the flow paths of the cells.

7. The honeycomb structure according to claim 4, wherein the lengths of the partition wall portions A of the respective cells are identical except for the cells adjacent to the outer peripheral side wall, and the lengths of the partition wall portions B of the respective cells become shorter for the cells having a longer distance from the straight line connecting the circumferential centers of the pair of terminal connection portions, in the cross section perpendicular to the direction of the flow paths of the cells.

\* \* \* \* \*